US012607288B2

(12) United States Patent
Raskar

(10) Patent No.: US 12,607,288 B2
(45) Date of Patent: Apr. 21, 2026

(54) INSULATED STRUCTURES AND METHODS OF MAKING THE SAME

(71) Applicant: WHIRLPOOL CORPORATION, Benton Harbor, MI (US)

(72) Inventor: Devidas Balu Raskar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 730 days.

(21) Appl. No.: 17/540,567

(22) Filed: Dec. 2, 2021

(65) Prior Publication Data

US 2023/0175633 A1    Jun. 8, 2023

(51) Int. Cl.
*F16L 59/02* (2006.01)
*F16L 59/04* (2006.01)
*F16L 59/065* (2006.01)

(52) U.S. Cl.
CPC ............. *F16L 59/028* (2013.01); *F16L 59/04* (2013.01); *F16L 59/065* (2013.01); *C01P 2004/32* (2013.01); *C01P 2004/61* (2013.01); *C01P 2006/10* (2013.01); *C01P 2006/32* (2013.01)

(58) Field of Classification Search
CPC .. F25D 23/062; F25D 23/06; F25D 2201/122; F16L 59/028; F16L 59/04; F16L 59/065; B29C 70/00; B29C 43/006; B29B 13/10; B29B 9/04; B29B 9/14; B01J 2/20; B01J 2/22; B01J 2/00; C01P 2004/32; C01P 2004/61; C01P 2006/10; C01P 2006/31
See application file for complete search history.

(56) References Cited

U.S. PATENT DOCUMENTS

| | | | | |
|---|---|---|---|---|
| 4,934,609 | A | * | 6/1990 | Lindauer ................... B29B 9/06 |
| | | | | 241/3 |
| 8,449,177 | B2 | | 5/2013 | Kvisteroy et al. |
| 9,321,237 | B2 | | 4/2016 | Hiemeyer et al. |
| 10,173,354 | B2 | | 1/2019 | Mack et al. |
| 10,222,116 | B2 | | 3/2019 | Allo et al. |
| 10,422,573 | B2 | | 9/2019 | Deka et al. |
| 10,781,963 | B2 | | 9/2020 | Uekado et al. |
| 10,907,886 | B2 | | 2/2021 | Allo et al. |
| 10,941,975 | B2 | | 3/2021 | Choi et al. |
| 10,995,488 | B1 | | 5/2021 | Allard et al. |
| 2005/0006813 | A1 | * | 1/2005 | Yamane ................. B29B 13/10 |
| | | | | 425/208 |
| 2017/0157809 | A1 | | 6/2017 | Deka et al. |
| 2017/0157890 | A1 | | 6/2017 | Deka et al. |

(Continued)

FOREIGN PATENT DOCUMENTS

| | | | | |
|---|---|---|---|---|
| CN | 101306828 | A | * | 11/2008 |
| CN | 204701022 | U | * | 10/2015 |
| CN | 107827467 | A | * | 3/2018 |

(Continued)

*Primary Examiner* — Kun Kai Ma
(74) *Attorney, Agent, or Firm* — Price Heneveld LLP

(57) ABSTRACT

An insulated structure includes a plurality of walls and a cavity defined by the plurality of walls. A core material is disposed within the cavity. The core material includes particles with a diameter that is in a range of 80-1600 μm. The core material disposed within the cavity can have a density in a range of greater than 350 kg/m³ to 600 kg/m³. Methods of manufacturing the insulated structure also disclosed.

16 Claims, 4 Drawing Sheets

(56)     References Cited

U.S. PATENT DOCUMENTS

| 2020/0033049 | A1 | | 1/2020 | Dherde et al. |
| 2020/0278149 | A1 | | 9/2020 | Ekshinge et al. |

FOREIGN PATENT DOCUMENTS

| CN | 109176946 | A | | 1/2019 | |
| CN | 110238986 | A | * | 9/2019 | |
| CN | 113276309 | A | * | 8/2021 | ............ B29B 13/06 |
| CN | 214239002 | U | * | 9/2021 | |
| CN | 114081199 | A | * | 2/2022 | |
| EP | 3693649 | A1 | | 8/2020 | |
| JP | 3683699 | B2 | * | 8/2005 | |
| JP | 2016510981 | A | * | 4/2016 | |
| JP | 2021042271 | A | * | 3/2021 | ........... A61K 8/0225 |
| WO | 2018164668 | A1 | | 9/2018 | |
| WO | 2020105055 | A1 | | 5/2020 | |

* cited by examiner

INSULATED STRUCTURES AND METHODS OF MAKING THE SAME

BACKGROUND OF THE DISCLOSURE

The present disclosure generally relates to insulated structures and methods of making the same.

SUMMARY OF THE DISCLOSURE

According to one aspect of the present disclosure, a method of producing an insulated structure includes introducing a raw material into a feed hopper. The method also includes compacting the raw material with at least one roller. The method further includes directing the raw material that has been compacted to a crusher. Additionally, the method includes directing the raw material that has been compacted to a granulator. Further, the method includes collecting the raw material, which has been compacted and exposed to both the crusher and the granulator, as a core material precursor. The method also includes filtering the core material precursor with a filter member.

According to another aspect of the present disclosure, an insulated structure includes a plurality of walls and a cavity defined by the plurality of walls. A core material is disposed within the cavity. The core material includes particles with a diameter that is in a range of 80-1600 μm. The core material can be disposed within the cavity to a density in a range of greater than 350 kg/m³ to 600 kg/m³.

These and other features, advantages, and objects of the present disclosure will be further understood and appreciated by those skilled in the art by reference to the following specification, claims, and appended drawings.

Figure 1:
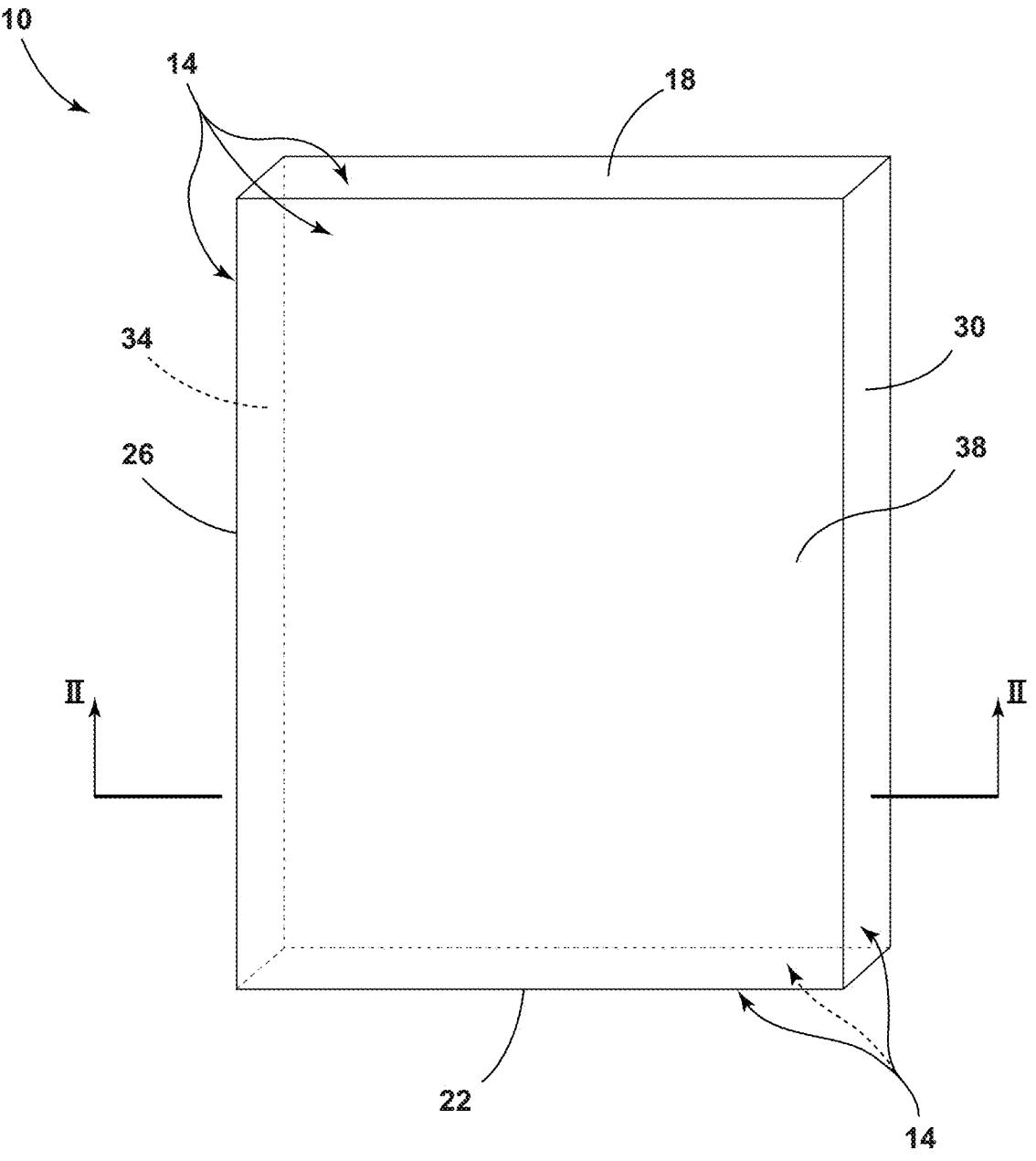
FIG. 1 is a front perspective view of an insulated structure, according to one example.

The components in the figures are not necessarily to scale, emphasis instead being placed upon illustrating the principles described herein.

DETAILED DESCRIPTION

The present illustrated embodiments reside primarily in combinations of method steps and apparatus components related to an insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Figure 2:
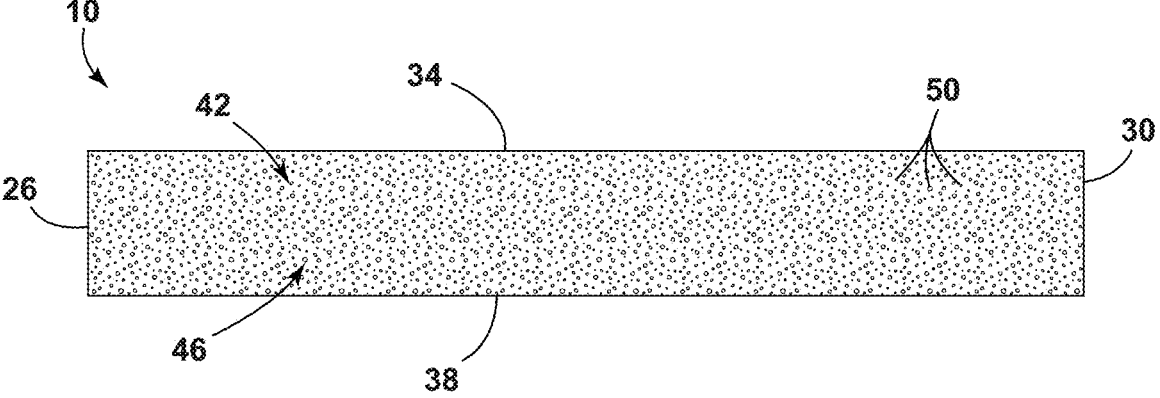
FIG. 2 is a cross-sectional view of the insulated structure of FIG. 1, taken along line II-II, illustrating a cavity thereof, according to one example.

Referring to FIGS. 1 and 2, reference numeral 10 generally designates an insulated structure. The insulated structure 10 can be employed as a component of an appliance, such as a thermally insulated appliance. In various examples, the appliance may be capable of passively or actively controlling a thermal environment within the appliance (e.g., a refrigerator, a freezer, a cooler, an oven, etc.). The insulated structure 10 includes a plurality of walls 14. For example, the plurality of walls 14 can include a top wall 18, a bottom wall 22, a first side wall 26, a second side wall 30, an exterior wall 34, and/or an interior wall 38. The first and second side walls 26, 30 each extend between the top and bottom walls 18, 22. Similarly, the exterior wall 34 and the interior wall 38 each extend between the top wall 18, the bottom wall 22, the first side wall 26, and the second side wall 30. The top and bottom walls 18, 22 may define a thickness of the insulated structure 10 and/or a width of the insulated structure 10. The first and second side walls 26, 30 may also define the thickness of the insulated structure 10. Additionally, or alternatively, the first and second side walls 26, 30 may define a height of the insulated structure 10. The exterior wall 34 and the interior wall 38 may extend in the height direction and the width direction of the insulated structure 10. The exterior wall 34 is opposite to the interior wall 38 and is therefore indicated with a phantom lead line in FIG. 1. The exterior wall 34 may be closest to a user when the insulated structure 10 is fully assembled with the appliance. The interior wall 38 may be further from the user than the exterior wall 34 when the insulated structure 10 is fully assembled with the appliance. In examples where the insulated structure 10 is employed as at least a portion of an access door (e.g., refrigerator door, cooler door, oven door, etc.), the interior wall 38 may be furthest from the user when the access door is in a closed position.

Referring again to FIGS. 1 and 2, the plurality of walls 14 define a cavity 42 therebetween. A core material 46 is disposed within the cavity 42. The core material 46 can include particles 50 with a diameter that is in a range of 80-1600 μm. For example, the diameter of the particles 50 can be about 80 μm, about 100 μm, about 150 μm, about 200 μm, about 250 μm, about 300 μm, about 350 μm, about 400 μm, about 450 μm, about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, and/or combinations or ranges thereof. While the size of the particles 50 is referred to with regard to a diameter, the present disclosure is not limited to circular or spherical particles. Rather, the particles 50 may be any polygon and the reference to a diameter thereof may refer to a dimension from one side of the particle 50 to an opposing side of the particle 50. In some examples, the dimensions referred to with regard to the diameter of the particles 50 may apply to a maximum distance or dimension across the particle 50 when the particle 50 is a polygon other than a circle or sphere. In various examples, the dimensions referred to with regard to the diameter of the particles 50 may apply to a minimum distance or dimension across the particle 50 when the particle 50 is a polygon other than a circle or sphere. Regardless of the shape of the particles 50, the core material 46 can include at least one component chosen from fumed silica, carbon black, perlites, silicon carbide, glass fibers, and glass microspheres.

Referring further to FIGS. 1 and 2, the core material 46 can be disposed within the cavity 42 to a density in a range of greater than 350 kg/m$^3$ to 600 kg/m$^3$. For example, the core material 46 can be present within the cavity 42 at a density of about 350 kg/m$^3$, about 400 kg/m$^3$, about 450 kg/m$^3$, about 500 kg/m$^3$, about 550 kg/m$^3$, about 600 kg/m$^3$, and/or combinations or ranges thereof. In various examples, a thermal conductivity of the core material 46 within the cavity 42 and/or the insulated structure 10 when fully assembled can be in a range of 1 mW/mK to 15 mW/mK. For example, the thermal conductivity of the core material 46 within the cavity 42 and/or the insulated structure 10 when fully assembled can be about 1.0 mW/mK, about 2.0 mW/mK, about 3.0 mW/mK, about 4.0 mW/mK, about 5.0 mW/mK, about 6.0 mW/mK, about 7.0 mW/mK, about 8.0 mW/mK, about 9.0 mW/mK, about 10 mW/mK, about 11 mW/mK, about 12 mW/mK, about 13 mW/mK, about 14 mW/mK, about 15 mW/mK, and/or combinations or ranges thereof. A pressure within the cavity 42 can be less than 100 Pascal when the insulated structure 10 is fully assembled. For example, the pressure within the cavity 42 when the insulated structure is fully assembled can be less than about 100 Pascal, less than about 90 Pascal, less than about 80 Pascal, less than about 70 Pascal, less than about 60 Pascal, less than about 50 Pascal, less than about 40 Pascal, less than about 30 Pascal, less than about 20 Pascal, less than about 10 Pascal, and/or combinations or ranges thereof.

Figure 3:
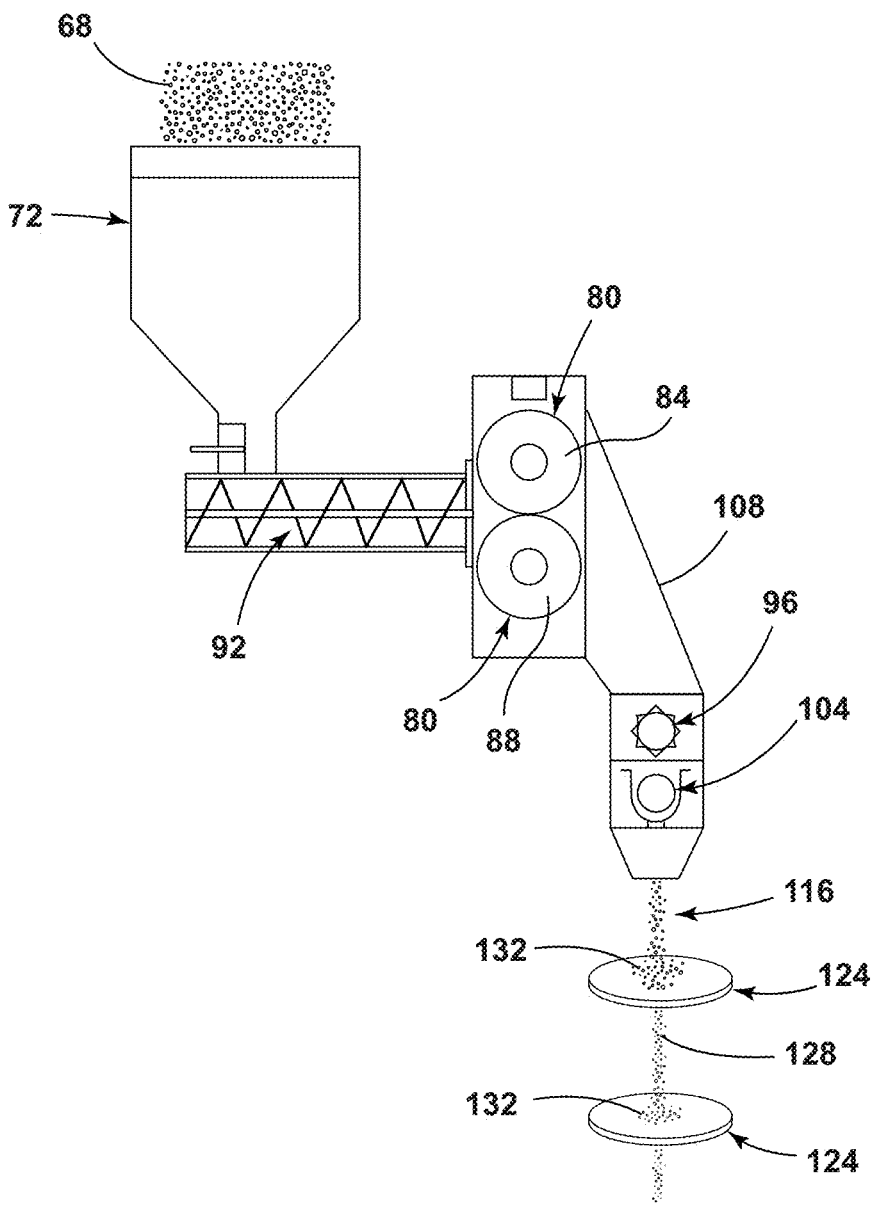
FIG. 3 is a schematic representation of an apparatus, illustrating processing of a raw material into a core material, according to one example.
Figure 4:
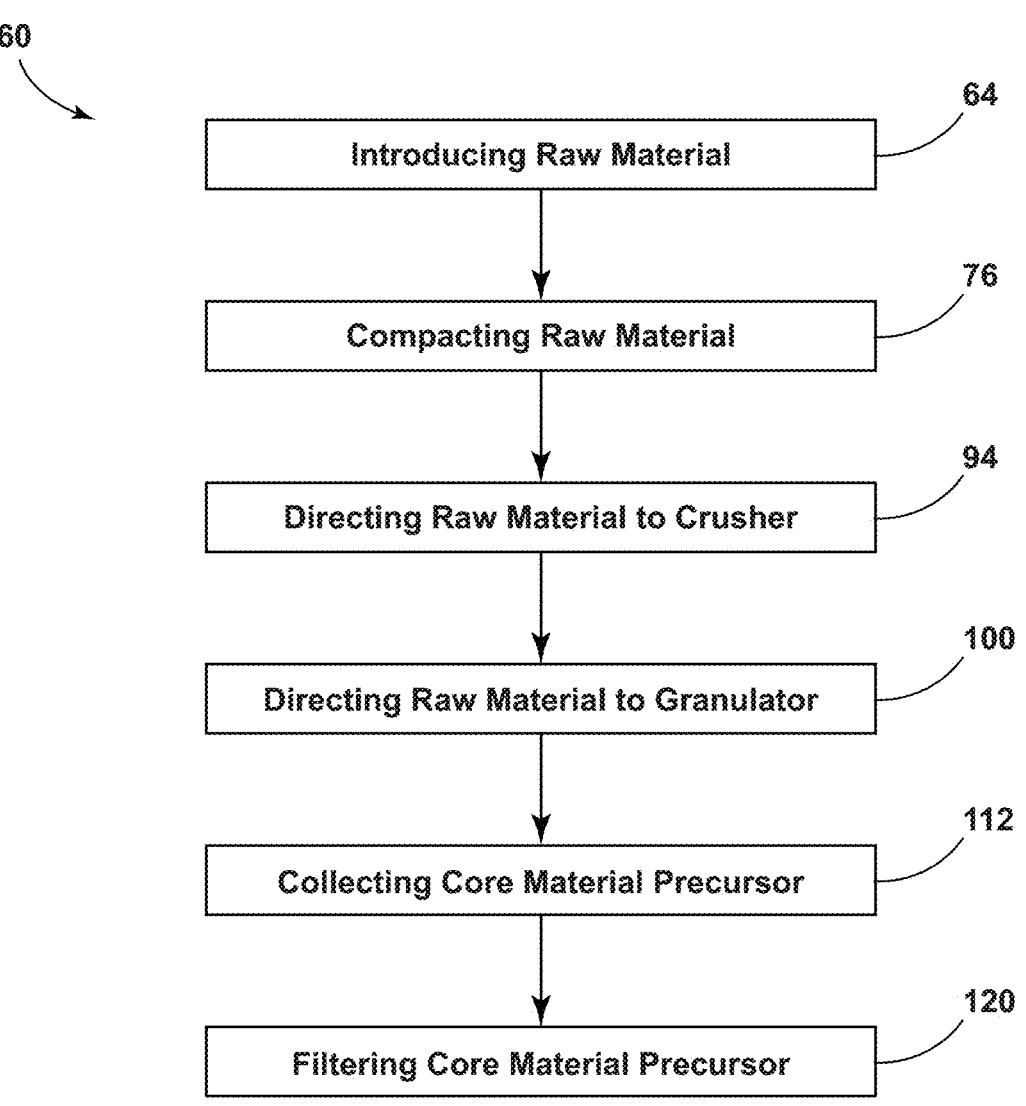
FIG. 4 is a flow diagram illustrating a method of producing the insulated structure, according to one example.

Referring now to FIGS. 3 and 4, a method 60 of producing the insulated structure 10 includes step 64 of introducing a raw material 68 into a feed hopper 72. The method 60 also includes step 76 of compacting the raw material 68 with at least one roller 80. For example, the at least one roller 80 can include a first roller 84 and a second roller 88. In the depicted example of FIG. 3, the first roller 84 and the second roller 88 are vertically oriented relative to one another such that the first roller 84 is positioned vertically above the second roller 88. However, alternative arrangements are contemplated and alternative arrangements do not depart from the concepts discussed herein. The first and second rollers 84, 88 are positioned in close proximity to one another to facilitate the compaction of the raw material 68 as the raw material 68 passes between the first and second rollers 84, 88. Accordingly, any alternative arrangement of the at least one roller 80 that facilitates compaction of the raw material 68 is contemplated herein. In some examples, the raw material 68 may be directed to a screw feeder 92 by the feed hopper 72. In such examples, the screw feeder 92 can direct the raw material 68 toward the at least one roller 80.

Referring again to FIGS. 3 and 4, the method 60 also includes step 94 of directing the raw material 68 that has been compacted to a crusher 96. Additionally, the method 60 includes step 100 of directing the raw material 68 that has been compacted to a granulator 104. In various examples, the raw material 68 may be directed to the crusher 96 and/or the granulator 104 by a chute 108. The method 60 further includes step 112 of collecting the raw material 68 that has been compacted and exposed to both the crusher 96 and the granulator 104. The raw material 68 that has been compacted and exposed to both the crusher 96 and the granulator 104 may be referred to as a core material precursor 116. The core material precursor 116 may include coarse particles and fine particles. The method 60 also includes step 120 of filtering the core material precursor 116 with a filter member 124. In various examples, the filter member 124 includes a pore size that is less than 80 μm such that particulates 128 (e.g., fine particles) that are less than 80 μm pass through the filter member 124. In such examples, a portion 132 of the core material precursor 116 that remains on the filter member 124 represents the core material 46 for use in the insulated structure 10. The particles 50 may be referred to as coarse particles and the particulates 128 may be referred to as fine particles. The terms "coarse" and "fine" are not intended to describe a particular texture or shape. Rather, the terms "coarse" and "fine," as used herein, are intended to differentiate between particles within the core material precursor 116 that do not pass through the filter member 124 and particles within the core material precursor 116 that do pass through the filter member 124. Accordingly, the terms "coarse" and "fine," as used herein, can be relative to the pore size of the filter member 124. Removal of the particulates 128, or fine particles, can improve the manufacturing process for the insulated structure 10. Specifically, by removing the particulates 128 from the core material precursor 116, the particulates 128 are prevented from imped-ing the decrease of the pressure within the cavity 42. For example, if the particulates 128 were to remain, the filter or screen that prevents the pump from taking up, or pulling in, the core material 46 can be plugged or clogged, thereby restricting flow of the gaseous components being evacuated and potentially over-working the pump. If the particulates 128 were to remain, it is also possible for the particulates 128 to bypass the filter or screen used to protect the pump and decrease an efficiency and/or operating lifetime of the pump.

Referring further to FIGS. 3 and 4, the core material 46 can include particles 50 with a diameter of 80 μm or greater. A size distribution of the particles 50 of the core material 46 can depend on the pore size or pore sizes of the filter member 124. In some examples, a plurality of filter members 124 may be employed. In such examples, the plurality of filter members 124 may be provided with successively smaller pore sizes such that the particles 50 collected on the plurality of filter members 124 are stratified or segregated by size. Such an arrangement may be beneficial in controlling a given distribution of diameters for the particles 50 that are deposited within the cavity 42. For example, during produc-tion, a first amount of the particles 50 may be taken from a first of the filter members 124, a second amount of the particles 50 may be taken from a second of the filter members 124, and a third amount of the particles 50 may be taken from a third of the filter members 124. In such an example, the first of the filter members 124 may have the largest pore size, the third of the filter members 124 may have the smallest pore size, and the second of the filter members 124 may have a pore size that is intermediate to the pore sizes of the first of the filter members 124 and the second of the filter members 124. Accordingly, the first amount of the particles 50, the second amount of the particles 50, and the third amount of the particles 50 may be chosen to control a size distribution of the particles 50 that are deposited into the cavity 42.

Referring still further to FIGS. 3 and 4, in some examples, the diameter of the particles 50 of the core material 46 are in a range of 80-1600 μm. For example, the diameter of the particles 50 can be about 80 μm, about 100 μm, about 150 μm, about 200 μm, about 250 μm, about 300 μm, about 350 μm, about 400 μm, about 450 μm, about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, and/or combina-tions or ranges thereof. Once the particles 50 of the core material 46 have been collected on the filtering member(s) 124 and, if desired, mixed to a predetermined ratio, these particles 50 can be placed within the cavity 42. Accordingly, the method 60 can include a step of depositing the core material 46 within the cavity 42 of the insulated structure 10. For example, the core material 46 may be deposited within the cavity 42 by blowing the core material 46 into the cavity 42 and/or activating a pump to decrease a pressure within the cavity 42. If a pump is used to decrease the pressure within the cavity 42 during deposition of the core material 46, a filter or screen may be employed to prevent the pump from taking up the core material 46, which could damage the pump. As stated above, the cavity 42 of the insulated structure 10 is defined by the plurality of walls 14.

Referring again to FIGS. 3 and 4, in the step of depositing the core material 46 within the cavity 42 of the insulated structure 10, the core material 46 can be disposed within the cavity 42 to a density that is within the range of greater than 350 kg/m³ to 600 kg/m³. For example, the core material 46 can be present within the cavity 42 at a density of about 350 kg/m³, about 400 kg/m³, about 450 kg/m³, about 500 kg/m³, about 550 kg/m³, about 600 kg/m³, and/or combinations or ranges thereof. The dimensions of the cavity 42 are known at the time of manufacture. Accordingly, the volume of the cavity 42 is also known at the time of manufacture. There-fore, in disposing the core material 46 within the cavity 42 to a desired density within the range of greater than 350 kg/m³ to 600 kg/m³, a change in weight of the insulated structure 10 may be monitored to determine when the desired density has been reached. Additionally, or alterna-tively, a flow rate of the core material 46 during the disposing or dispensing of the core material 46 may be known in terms of mass per unit time (e.g., kilograms per minute). In such examples, a predetermined time duration may be used to dispense or dispose the desired amount of core material 46 into the cavity 42 to attain the desired density of the core material 46 within the cavity 42. In some examples, a change in weight of the insulated structure 10 and an elapsed time of disposing the core material 46 within the cavity 42 may be monitored to determine when a desired density of the core material 46 within the cavity 42 has been reached. In such an example, the core material 46 may cease being added to the cavity 42 once a predetermined amount of time has elapsed and a predetermined change in the weight of the insulated structure 10 has been observed.

Referring yet again to FIGS. 3 and 4, the method 60 can include a step of evacuating at least a portion of gaseous components (e.g., air) within the cavity 42 of the insulated structure 10. For example, a pump may be attached to the insulated structure 10 and activated to evacuate, or pull, at least a portion of the gaseous components from the cavity 42. In various examples, the pump used to remove at least a portion of the gaseous components within the cavity 42 may be the same pump that can be employed during the deposition of the core material 46 within the cavity 42. In evacuating at least a portion of the gaseous components within the cavity 42, a pressure within the cavity 42 is decreased (e.g., to attain a less-than-atmospheric pressure). The term "atmospheric pressure" is intended to refer to the pressure exerted by the weight of the atmosphere, which at sea level has a mean value of 101,325 Pascal. Said another way, at the time of manufacture, a pressure that is less than the environment immediately surrounding the insulated structure 10 may be established within the cavity 42. For example, the pressure within the cavity 42 when the insu-lated structure 10 is fully assembled can be less than about 100 Pascal, less than about 90 Pascal, less than about 80 Pascal, less than about 70 Pascal, less than about 60 Pascal, less than about 50 Pascal, less than about 40 Pascal, less than about 30 Pascal, less than about 20 Pascal, less than about 10 Pascal, and/or combinations or ranges thereof.

Referring still further to FIGS. 3 and 4, the method 60 can include a step where the cavity 42 of the insulated structure 10 is sealed from the environment such that gaseous com-ponents of the environment are prevented from entering into the cavity 42. For example, an aperture defined by one of the plurality of walls 14 may be employed in depositing the core material 46 within the cavity 42. The same aperture employed to deposit the core material 46 within the cavity 42 may be used when reducing the pressure within the cavity 42. In such an example, a filter or screen may be placed over the aperture following deposition of the core material 46 within the cavity 42 and prior to decreasing the pressure within the cavity 42 to prevent the deposited core material 46 from entering the pump. In alternative examples, a separate, or second, aperture may be employed for reducing the pressure within the cavity 42. In one example, once the core material 46 has been deposited within the cavity 42, the cavity 42 may be sealed to complete assembly of the insulated structure 10. Alternatively, the sealing of the cavity 42 of the insulated structure 10 from the environment can be executed after the core material 46 has been deposited within the cavity 42 and the pressure within the cavity 42 has been decreased to a level that is less-than-atmospheric pressure. In any of the preceding examples, upon completion of the step of sealing the cavity 42 of the insulated structure 10 (e.g., sealing one or more apertures defined by one or more of the plurality of walls 14), manufacture and/or assembly of the insulated structure 10 may be completed. The insulated structure 10 can be a subassembly of a larger assembly (e.g., an appliance). In various examples, a thermal conductivity of the core material 46 within the cavity 42 and/or the insulated structure 10 when fully assembled can be in a range of 1 mW/mK to 15 mW/mK. For example, the thermal conductivity of the core material 46 within the cavity 42 and/or the insulated structure 10 when fully assembled can be about 1.0 mW/mK, about 2.0 mW/mK, about 3.0 mW/mK, about 4.0 mW/mK, about 5.0 mW/mK, about 6.0 mW/mK, about 7.0 mW/mK, about 8.0 mW/mK, about 9.0 mW/mK, about 10 mW/mK, about 11 mW/mK, about 12 mW/mK, about 13 mW/mK, about 14 mW/mK, about 15 mW/mK, and/or combinations or ranges thereof.

According to an aspect of the present disclosure, a method of producing an insulated structure 10 includes introducing a raw material 68 into a feed hopper 72. The method also includes compacting the raw material 68 with at least one roller 80. The method further includes directing the raw material 68 that has been compacted to a crusher 96. Additionally, the method includes directing the raw material 68 that has been compacted to a granulator 104. Further, the method includes collecting the raw material 68 that has been compacted and exposed to both the crusher 96 and the granulator 104 as a core material precursor 116. The method also includes filtering the core material precursor 116 with a filter member 124.

According to another aspect, a filter member 124 includes a pore size that is less than 80 μm such that particulates 128 that are less than 80 μm pass through the filter member 124.

According to another aspect, a portion 132 of a core material precursor 116 that remains on a filter member 124 represents a core material 46 for use in an insulated structure 10. The core material 46 can include particles 50 with a diameter of 80 μm or greater.

According to another aspect, a diameter of particles 50 of a core material 46 can be in a range of 80-1600 μm.

According to another aspect, a range of a diameter of particles 50 of a core material 46 can be 80-150 μm.

According to another aspect, a core material 46 is deposited within a cavity 42 of an insulated structure 10. The cavity 42 of the insulated structure 10 can be defined by a plurality of walls 14.

According to another aspect, a core material 46 disposed within a cavity 42 has a density in a range of greater than 350 kg/m³ to 600 kg/m³.

According to another aspect, a method of producing an insulated structure 10 includes evacuating at least a portion of gaseous components within a cavity 42 of the insulated structure 10.

According to another aspect, a method of producing an insulated structure 10 includes sealing a cavity 42 of an insulated structure 10 from an environment such that gaseous components from the environment do not enter into the cavity 42.

According to another aspect, a pressure within a cavity 42 can be less than 100 Pascal following evacuation of at least a portion of gaseous components within the cavity 42 of an insulated structure 10 and sealing of the cavity 42 of the insulated structure 10 from an environment such that gaseous components from the environment do not enter into the cavity 42.

According to another aspect, a thermal conductivity of a core material 46 within a cavity 42 is in a range of 1 mW/mK to 15 mW/mK.

According to another aspect, a method of producing an insulated structure 10 includes directing a raw material 68 to a screw feeder 92. The screw feeder 92 directs the raw material 68 toward at least one roller 80.

According to another aspect, a core material 46 includes at least one component chosen from fumed silica, carbon black, perlites, silicon carbide, glass fibers, and glass microspheres.

According to another aspect, an insulated structure 10 includes a plurality of walls 14. A cavity 42 is defined by the plurality of walls 14. A core material 46 is disposed within the cavity 42. The core material 46 includes particles 50 that have a diameter that is in a range of 80-1600 μm. The core material 46 is disposed within the cavity 42 to a density in a range of greater than 350 kg/m³ to 600 kg/m³.

According to another aspect, a thermal conductivity of a core material 46 within a cavity 42 is in a range of 1 mW/mK to 15 mW/mK.

According to another aspect, a diameter of particles 50 of a core material 46 can be in a range of 80-200 μm.

According to another aspect, a diameter of particles 50 of a core material 46 can be in a range of 80-150 μm.

According to another aspect, a density of a core material 46 can be in a range of 450 kg/m³ to 600 kg/m³.

According to another aspect, a pressure within a cavity 42 of an insulated structure 10 can be less than 100 Pascal when fully assembled.

According to another aspect, a core material 46 can include at least one component chosen from fumed silica, carbon black, perlites, silicon carbide, glass fibers, and glass microspheres.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method of producing an insulated structure, the method comprising:
   introducing a raw material into a feed hopper;
   compacting the raw material with at least one roller;
   directing the raw material that has been compacted to a crusher;
   directing the raw material that has been compacted to a granulator;
   collecting the raw material that has been compacted and exposed to both the crusher and the granulator as a core material precursor;
   filtering the core material precursor with a filter member, wherein the filter member comprises a pore size that is approximately 80 μm such that particles that are 80 μm and less pass through the filter member; and
   depositing a portion of the core material precursor that remains within a cavity of the insulated structure, wherein the cavity of the insulated structure is defined by a plurality of walls, and wherein a pressure within the cavity is less than 100 Pascal.

2. The method of claim 1, wherein a portion of the core material precursor that remains on the filter member represents a core material for use in the insulated structure, and wherein the core material comprises particles with a diameter of 80 μm or greater.

3. The method of claim 2, wherein the diameter of the particles of the core material is in a range of 80-1600 μm.

4. The method of claim 3, wherein the range of the diameter of the particles of the core material is 80-150 μm.

5. The method of claim 1, wherein the core material disposed within the cavity comprises a density in a range of greater than 350 kg/m³ to 600 kg/m³.

6. The method of claim 1, further comprising:
   sealing the cavity of the insulated structure from an environment such that gaseous components from the environment do not enter into the cavity.

7. The method of claim 6, wherein a thermal conductivity of the core material within the cavity is in a range of 1 mW/mK to 15 mW/mK.

8. The method of claim 1, further comprising:
   directing the raw material to a screw feeder, wherein the screw feeder directs the raw material toward the at least one roller.

9. The method of claim 2, wherein the core material comprises at least one component chosen from fumed silica, carbon black, perlites, silicon carbide, glass fibers, and glass microspheres.

10. The method of claim 1, further comprising:
   forming the core material to be spherical particles.

11. The method of claim 1, further comprising:
   forming the core material to be polyhedron particles.

12. The method of claim 1, wherein the step of compacting the raw material with at least one roller further comprises:
   compacting the raw material by directing the raw material through first and second vertically oriented rollers.

13. The method of claim 10, further comprising:
   producing a pressure within the cavity that is less than atmospheric pressure when fully assembled.

14. A method of producing an insulated structure, the method comprising:
   introducing a raw material into a feed hopper;
   compacting the raw material with at least one roller;
   directing the raw material that has been compacted to a crusher;
   directing the raw material that has been compacted to a granulator;
   collecting the raw material that has been compacted and exposed to both the crusher and the granulator as a core material precursor;
   filtering the core material precursor with a filter member to remove particulates smaller than 80 μm, wherein a portion of the core material precursor that remains on the filter member represents a core material for use in the insulated structure;
   depositing the core material within a cavity of the insulated structure, wherein the cavity of the insulated structure is defined by a plurality of walls;
   evacuating at least a portion of gaseous components within the cavity of the insulated structure; and
   sealing the cavity of the insulated structure from an environment such that gaseous components from the environment do not enter into the cavity, wherein a pressure within the cavity is less than 100 Pascal following the steps of evacuating at least a portion of gaseous components within the cavity of the insulated structure and sealing the cavity of the insulated structure from the environment such that gaseous components from the environment do not enter into the cavity.

15. The method of claim 14, wherein the core material comprises at least one component chosen from fumed silica, carbon black, perlites, silicon carbide, glass fibers, and glass microspheres.

16. The method of claim 14, further comprising:
   producing a pressure within the cavity that is less than atmospheric pressure when fully assembled.

* * * * *